United States Patent Office 3,515,716
Patented June 2, 1970

3,515,716
WATER-SOLUBLE MONOAZO DYES
Hiroshi Sugiyama, Ashiya-shi, Hideo Otsuka, Ibaraki-shi, and Masakazu Yamamoto, Takarazuka-shi, Japan, assignors to Sumitomo Chemical Company, Ltd., Osaka, Japan, a corporation of Japan
No Drawing. Filed Dec. 6, 1966, Ser. No. 599,388
Claims priority, application Japan, Dec. 10, 1965, 40/76,166
Int. Cl. C09b 29/16
U.S. Cl. 260—200                                    10 Claims

ABSTRACT OF THE DISCLOSURE

A water-soluble monoazo dye having the formula

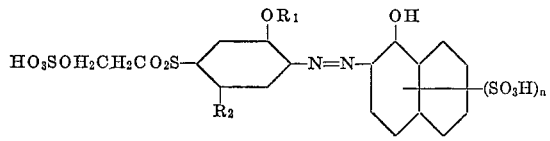

wherein $R_1$ means methyl or ethyl radical, $R_2$ means methyl, methoxy or ethoxy radical and $n$ means an integer of 1 to 3.

---

This invention relates to novel water-soluble monoazo dyes, method for the production of the same and method for dyeing fibers in characteristic deep red tint with the same.

More specifically, this invention relates to novel water-soluble monoazo dyes represented by the following formula,

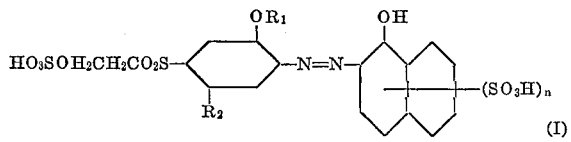

wherein $R_1$ means methyl or ethyl radical, $R_2$ means methyl, methoxy or ethoxy radical and $n$ means an integer of 1 to 3, and method for the production thereof.

It also relates to method for dyeing fibers, especially fibers made from a member of natural or regenerated cellulose materials such as cotton, hemp and viscose rayon, and polyvinyl alcohol materials, in characteristic deep red tint with the said dyes.

So far, this kind of dyes having a sulfatoethylsulfone radical, for example, a dye having the following formula,

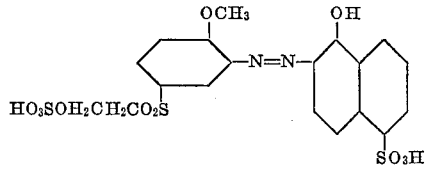

have been known as being employable for dyeing fibers in red tint.

While, the present inventors have broadly studied the dyes more suitable for dyeing fibers in characteristic deep red tint which has been strongly requested in this industry. The present inventors have found that the requested tint in this industry can be obtained by the provision of the present novel monoazo dyes of the Formula I, comprising, as the diazo component, amines of the following formula,

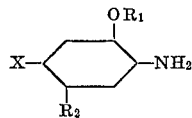

wherein $R_1$ and $R_2$ have the same meanings as defined above and X means a radical of $-SO_2CH_2CH_2OH$ or $-SO_2CH_2CH_2OSO_3H$. Besides, surprising is the finding that the present dyes can be employed with a higher color yield on fibers according to the impregnation dyeing method, compared with the known dyes mentioned above. Thus, one object of the present invention is to provide novel water-soluble monoazo dyes for dyeing fibers in characteristic deep red tint with high fastnesses, besides with a higher color yield on fibers according to the impregnation dyeing method, compared with the known dyes.

Another object of the present invention is to provide method for the production thereof.

Still another object of the present invention is to provide method for dyeing fibers in characteristic deep red tint.

Further objects of the present invention will be apparent from the following detailed descriptions.

The present inventors have found that these and other objects of the present invention can be accomplished by provision of novel water-soluble monoazo dyes represented by the following formula,

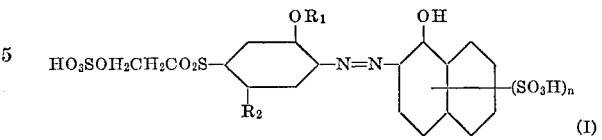

wherein $R_1$ means methyl or ethyl radical, $R_2$ means methyl, methoxy or ethoxy radical and $n$ means an integer of 1 to 3, and method for the production thereof which comprises contacting a diazotized amine of the formula,

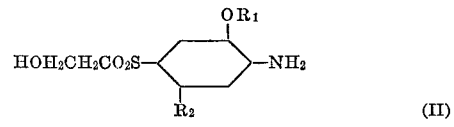

wherein $R_1$ and $R_2$ have the same meanings as defined above, with a 1-hydroxynaphthalenesulfonic acid of the formula,

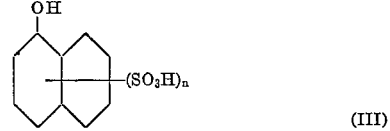

wherein $n$ means an integer of 1 to 3, and esterifying the dyes derived with sulfuric acid at the hydroxy radical of the β-hydroxyethylsulfone radical according to the conventional esterifying procedures, or contacting a diazotized amine of the formula,

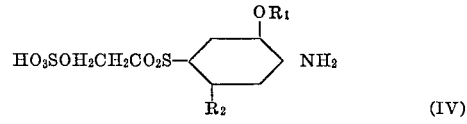

wherein $R_1$ and $R_2$ have the same meanings as defined above, with a 1-hydroxynaphthalenesulfonic acid of the Formula III.

In the present invention, method for dyeing fibers is also provided, which comprises contacting fibers with the present dyes represented by the Formula I in the presence of acid binding agents.

A full understanding on the present invention can be given with reference to the following detailed illustrations.

As amines employed in the present invention 2-methoxy - 5-methylaniline-4-β-hydroxyethylsulfone, 2,5-dimethoxyaniline - 4 - β - hydroxyethylsulfone, 2-ethoxy-5-methylaniline - 4 - β - hydroxyethylsulfone and 2,5-diethoxyaniline - 4 - β - hydroxyethylsulfone or the sulfuric acid esters thereof are exemplified, but they are, of course, not to limit the scope of the present invention.

1-hydroxynaphthalenesulfonic acids of the Formula III employed in the present invention are as follows, which are, of course, not to limit the scope of the present invention 1-hydroxynaphthalene-3-sulfonic acid
1-hydroxynaphthalene-4-sulfonic acid
1-hydroxynaphthalene-5-sulfonic acid
1-hydroxynaphthalene-3,6-disulfonic acid
1-hydroxynaphthalene-3,8-disulfonic acid
1-hydroxynaphthalene-3,6,8-trisulfonic acid.

In carrying out the production methods of the present invention, 1 mol of the said amine (II) may be diazotized with hydrochloric acid and aqueous sodium nitrite solution according to the usual diazotizing procedures and the resulting diazo mixture is introduced dropwise into a solution previously prepared by dissolving at least 1 mol of 1-hydroxynaphthalenesulfonic acid in water, the reaction mixture being maintained within pH 4 to 7 during the reaction course by addition of sodium carbonate.

After the reaction is over, potassium chloride is added to the mixture to precipitate crystals, which are separated by filtration and dried.

The resulting crystals are added into sulfuric acid of 100% strength and the mixture is stirred for a sufficient period of time to complete the esterification reaction.

While, amines of the Formula IV are treated with a 1-hydroxynaphthalenesulfonic acid of the Formula III according to the same procedure as mentioned above with the exception of esterification after the coupling reaction. Thus, the objective dyes, which may be employed for dyeing fibers in characteristic deep red tint, are obtained. Hereon, the coupling reaction in the present invention may be advantageously controlled at the pH range of between 4 and 7.

In case of controlling the present reaction at higher pH range than that, the dyes suitable for dyeing fibers in objective characteristic deep red tint can hardly be obtained in pure quality.

Concretely speaking about this reason, when a 1-hydroxynaphthalenesulfonic acid having no sulfonic acid radical at 4-position, for example, 1-hydroxynaphthalene-3-sulfonic acid, 1-hydroxynaphthalene-3,6-disulfonic acid, etc. is employed as the coupling component, the coupling reaction tends to be orientated to 4-position at relatively high pH range. Besides, the amines of the Formula IV, namely amines previously esterified with sulfuric acid could not be employed without decomposition at such higher pH range. On the other hand, in case of controlling at the pH range less than 4, it takes too much long reaction period of time for completion.

The dyes in the present invention are suitable for dyeing various kinds of fibers, especially fibers made from a member of natural and regenerated cellulose materials such as cotton, hemp and viscose rayon, and polyvinyl alcohol materials, in characteristic deep red tint.

The dyeing in accordance with the present invention is effected in the presence of acid binding agents by the methods such as impregnation, printing and padding. It is also possible by fixing the dyes with the acid binding agents after printing or padding without any fixing agents. Hereon, it is remarkable that a higher color yield, compared with the known dyes mentioned above can be obtained according to the impregnation dyeing method.

The dyeings obtained in accordance with the present invention are distinguished by characteristic deep red tint and high fastnesses to wet processing, light and chlorine resistance.

The present invention will be illustrated more concretely with reference to the following examples, which are given by way of mere illustration and not by way of limitation of the scope of the present invention.

All parts and percentages are by weight.

EXAMPLE 1

A mixture of 36.8 parts of 2-methoxy-5-methylaniline-4-hydroxyethylsulfone and 90 parts of 100% sulfuric acid is stirred for 2 hours at a temperature of 15° to 30° C. and the reaction mixture is poured onto 270 parts of ice and water, thereby to precipitate crystals, which are separated by filtration.

The resulting ester is introduced into 350 parts of ice and water and diazotized with 16 parts of hydrochloric acid and 8.3 parts of sodium nitrite in aqueous solution.

The thus obtained diazo mixture is introduced dropwise into a solution previously prepared by dissolving 34.0 parts of 1-hydroxynaphthalene-5-sulfonic acid in 300 parts of water which is neutralized with 10.2 parts of sodium bicarbonate, the reaction mixture being maintained at the pH within 6 to 7 during the reaction course by addition of an aqueous solution containing about 20 parts of sodium carbonate.

After the reaction is over, 70 parts of potassium chloride is added thereto to precipitate crystals, which are separated by filtration and dried up.

The thus obtained dye having the following formula,

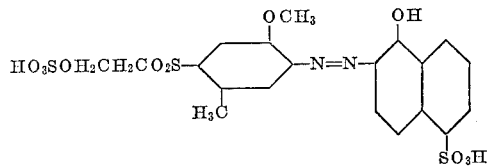

may be employed for dyeing cotton in brilliant bluish red tint with respectively 4–5 or higher degree of fastnesses to light, washing and chlorine resistance.

EXAMPLE 2

10.8 parts of the amine same as in Example 1 is dissolved in 100 parts of ice and water and 5.5 parts of 35% hydrochloric acid and the mixture is added with 2.8 parts of sodium nitrite in aqueous solution.

The resulting diazo mixture is introduced into a solution previously prepared by dissolving 10.5 parts of 1-hydroxynaphthalene-4-sulfonic acid in 100 parts of water together with 8 parts of sodium carbonate while being cooled. After the reaction is over, 20 parts of potassium chloride is added to precipitate crystals, which are separated by filtration and dried up.

The crystals obtained are dissolved in 100 parts of 100% sulfuric acid at temperature of 20° C.

After 2 hour stirring, the mixture is poured onto 200 parts of ice and water and added with 15 parts of potassium chloride, thereby to isolate crystals, which are separated by filtration. The wet cake is dissolved in 150 parts of water and the pH is adjusted at 6 to 7 by addition of aqueous sodium carbonate. Thereafter, 15 parts of potassium chloride is added to the resulting solution to precipitate crystals, which are separated by filtration and dried up.

The thus obtained dye having the following formula,

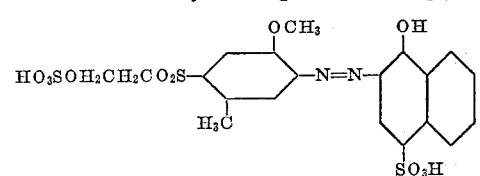

may be employed for dyeing cotton in brilliant yellowish red tint with 5 or higher degree of fastnesses to light and washing and 4–5 degree of fastness to chlorine resistance.

By use of amines shown in the column (A) and 1-hydroxynaphthalenesulfonic acids shown in the column (B) in the following table, the dyes suitable for dyeing cotton in characteristic red tint shown in the column (C) in the same table are obtained according to similar way as in Examples 1 to 2.

| | A (amine) | B 1-hydroxynaphthalene-sulfonic acid derivatives | C (tint) |
|---|---|---|---|
| Example No.: 3 | HOH₂CH₂CO₂S— (ring with OCH₃, H₃C, NH₂) | (naphthalene with OH, HO₃S—, —SO₃H) | Yellowish red. |
| 4 | Same as above | (naphthalene with OH, SO₃H, HO₃S—) | Red. |
| 5 | do | (naphthalene with OH, SO₃H, HO₃S—, —SO₃H) | Red. |
| 6 | do | (naphthalene with OH, HO₃S—) | Yellowish red. |
| 7 | do | (naphthalene with OH, SO₃H) | Bluish red. |
| 8 | HOH₂CH₂CO₂S— (ring with OCH₃, H₃CO, NH₂) | (naphthalene with OH, HO₃S—, —SO₃H) | Red. |
| 9 | HOH₂CH₂CO₂S— (ring with OC₂H₅, H₅C₂O, NH₂) | (naphthalene with OH, HO₃S—, —SO₃H) | Red. |

What we claim is:

1. A water-soluble monoazo dyes represented by the following formula,

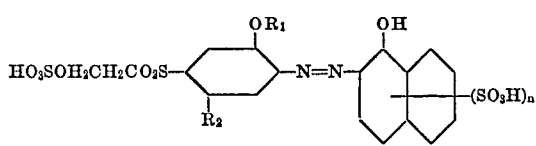

wherein R₁ means methyl or ethyl radical, R₂ means methyl, methoxy or ethoxy radical and $n$ means an integer of 1 to 3.

2. A water-soluble monoazo dye represented by the following formula,

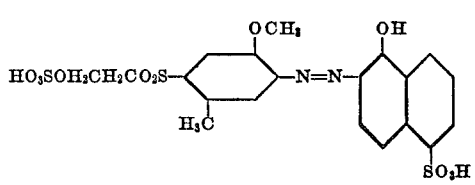

3. A water-soluble monoazo dye represented by the following formula,

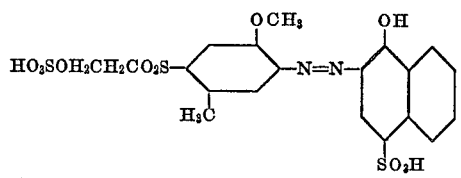

4. A water-soluble monoazo dye represented by the following formula,

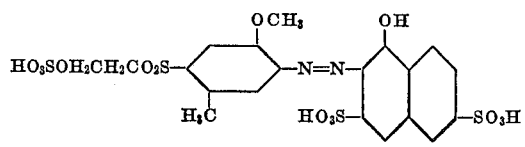

5. A water-soluble monoazo dye represented by the following formula,

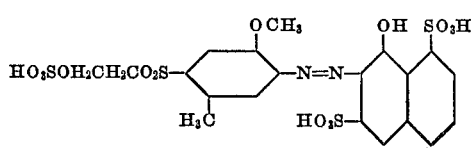

6. A water-soluble monoazo dye represented by the following formula,

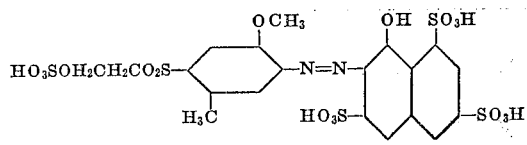

7. A water-soluble monoazo dye represented by the following formula,

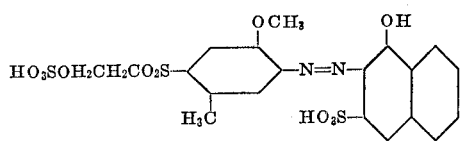

8. A water-soluble monoazo dye represented by the following formula,

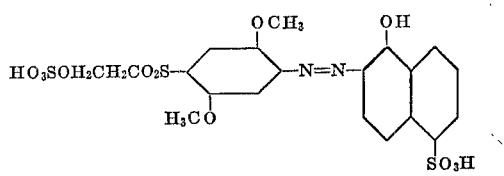

9. A water-soluble monoazo dye represented by the following formula,

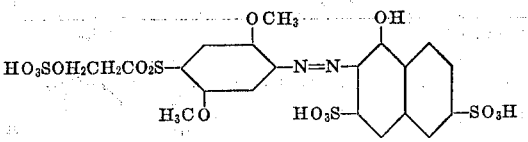

10. A water-soluble monoazo dye represented by the following formula,

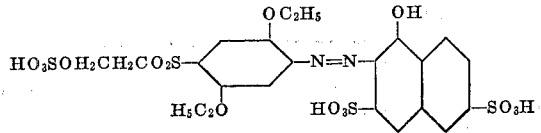

References Cited

UNITED STATES PATENTS 3,135,730 6/1964 Heyna et al. ———— 260—200
3,202,652 8/1965 Meininger et al. ———— 260—200

CHARLES B. PARKER, Primary Examiner

C. F. WARREN, Assistant Examiner

U.S. Cl. X.R.

8—41, 50, 51